United States Patent
Cronie et al.

(10) Patent No.: US 9,667,379 B2
(45) Date of Patent: *May 30, 2017

(54) ERROR CONTROL CODING FOR ORTHOGONAL DIFFERENTIAL VECTOR SIGNALING

(75) Inventors: Harm Cronie, Lausanne (CH); Amin Shokrollahi, Préverenges (CH)

(73) Assignee: ECOLE POLYTECHNIQUE FEDERALE DE LAUSANNE (EPFL) (CH)

( * ) Notice: Subject to any disclaimer, the term of this patent is extended or adjusted under 35 U.S.C. 154(b) by 952 days.

This patent is subject to a terminal disclaimer.

(21) Appl. No.: 13/154,009

(22) Filed: Jun. 6, 2011

(65) Prior Publication Data

US 2011/0299555 A1 Dec. 8, 2011

Related U.S. Application Data

(60) Provisional application No. 61/351,845, filed on Jun. 4, 2010.

(51) Int. Cl.
*H04J 13/12* (2011.01)
*H04L 1/00* (2006.01)

(52) U.S. Cl.
CPC .......... *H04L 1/0041* (2013.01); *H04L 1/0057* (2013.01)

(58) Field of Classification Search
None
See application file for complete search history.

(56) References Cited

U.S. PATENT DOCUMENTS

| 3,636,463 | A | 1/1972 | Ongkiehong |
| 3,939,468 | A | 2/1976 | Mastin |
| 4,163,258 | A | 7/1979 | Ebihara et al. |
| 4,181,967 | A | 1/1980 | Nash et al. |
| 4,206,316 | A | 6/1980 | Burnsweig et al. |
| 4,486,739 | A | 12/1984 | Franaszek et al. |
| 4,499,550 | A | 2/1985 | Ray et al. |

(Continued)

FOREIGN PATENT DOCUMENTS

| CN | 101478286 | 7/2009 |
| EP | 2039221 B1 | 3/2009 |

(Continued)

OTHER PUBLICATIONS

Abbasafar "Generalized Differential Vector Signaling", IEEE International Conference on Communications, ICC'09 (Jun. 14, 2009), pp. 1-5.*

(Continued)

*Primary Examiner* — Hassan Phillips
*Assistant Examiner* — Duc Duong
(74) *Attorney, Agent, or Firm* — Invention Mine LLC (57) ABSTRACT

Using a transformation based, at least in part, on a non-simple orthogonal matrix, data may be transmitted over a data bus in a manner that is resilient to one or more types of signal noise, that does not require a common reference at the transmission and acquisition points, and/or that has a pin-efficiency that is greater than 50% and may approach that of single-ended signaling. Such transformations may be implemented in hardware in an efficient manner. The transformation may be combined with methods from forward error correction to lower the required transmission power.

27 Claims, 7 Drawing Sheets

(56) References Cited

U.S. PATENT DOCUMENTS

| | | | |
|---|---|---|---|
| 4,722,084 | A | 1/1988 | Morton |
| 4,772,845 | A | 9/1988 | Scott |
| 4,864,303 | A | 9/1989 | Ofek |
| 5,053,974 | A | 10/1991 | Penz |
| 5,166,956 | A | 11/1992 | Baltus et al. |
| 5,168,509 | A | 12/1992 | Nakamura et al. |
| 5,283,761 | A | 2/1994 | Gillingham |
| 5,311,516 | A | 5/1994 | Kuznicki |
| 5,331,320 | A | 7/1994 | Cideciyan |
| 5,412,689 | A | 5/1995 | Chan et al. |
| 5,449,895 | A | 9/1995 | Hecht |
| 5,461,379 | A | 10/1995 | Weinman |
| 5,511,119 | A | 4/1996 | Lechleider |
| 5,553,097 | A | 9/1996 | Dagher |
| 5,566,193 | A | 10/1996 | Cloonan |
| 5,599,550 | A | 2/1997 | Kohlruss et al. |
| 5,659,353 | A | 8/1997 | Kostreski et al. |
| 5,727,006 | A | 3/1998 | Dreyer |
| 5,802,356 | A | 9/1998 | Gaskins |
| 5,825,808 | A * | 10/1998 | Hershey et al. ............ 375/146 |
| 5,856,935 | A | 1/1999 | Moy |
| 5,875,202 | A | 2/1999 | Venters |
| 5,949,060 | A | 9/1999 | Schattschneider |
| 5,995,016 | A | 11/1999 | Perino |
| 6,005,895 | A | 12/1999 | Perino et al. |
| 6,084,883 | A | 7/2000 | Norrell et al. |
| 6,119,263 | A | 9/2000 | Mowbray |
| 6,172,634 | B1 | 1/2001 | Leonowich et al. |
| 6,175,230 | B1 | 1/2001 | Hamblin et al. |
| 6,278,740 | B1 | 8/2001 | Nordyke |
| 6,359,931 | B1 | 3/2002 | Perino et al. |
| 6,378,073 | B1 | 4/2002 | Davis |
| 6,398,359 | B1 | 6/2002 | Silverbrook |
| 6,404,820 | B1 | 6/2002 | Postol |
| 6,417,737 | B1 | 7/2002 | Moloudi et al. |
| 6,452,420 | B1 | 9/2002 | Wong |
| 6,473,877 | B1 | 10/2002 | Sharma |
| 6,504,875 | B2 | 1/2003 | Perino et al. |
| 6,509,773 | B2 | 1/2003 | Buchwald |
| 6,556,628 | B1 | 4/2003 | Poulton et al. |
| 6,563,382 | B1 | 5/2003 | Yang |
| 6,621,427 | B2 | 9/2003 | Greenstreet |
| 6,624,699 | B2 | 9/2003 | Yin |
| 6,650,638 | B1 | 11/2003 | Walker et al. |
| 6,661,355 | B2 | 12/2003 | Cornelius et al. |
| 6,686,879 | B2 | 2/2004 | Shattil |
| 6,766,342 | B2 | 7/2004 | Kechriotis |
| 6,839,429 | B1 * | 1/2005 | Gaikwad et al. ............ 379/417 |
| 6,854,030 | B2 | 2/2005 | Perino |
| 6,865,234 | B1 | 3/2005 | Agazzi |
| 6,865,236 | B1 | 3/2005 | Terry |
| 6,898,724 | B2 | 5/2005 | Chang |
| 6,927,709 | B2 | 8/2005 | Kiehl |
| 6,954,492 | B1 | 10/2005 | Williams |
| 6,963,622 | B2 | 11/2005 | Eroz |
| 6,990,138 | B2 | 1/2006 | Bejjani et al. |
| 6,999,516 | B1 | 2/2006 | Rajan |
| 7,053,802 | B2 | 5/2006 | Cornelius |
| 7,075,996 | B2 | 7/2006 | Simon et al. |
| 7,085,153 | B2 | 8/2006 | Ferrant et al. |
| 7,085,336 | B2 | 8/2006 | Lee |
| 7,127,003 | B2 | 10/2006 | Rajan |
| 7,130,944 | B2 | 10/2006 | Perino |
| 7,142,612 | B2 | 11/2006 | Horowitz et al. |
| 7,142,865 | B2 | 11/2006 | Tsai |
| 7,164,631 | B2 | 1/2007 | Tateishi |
| 7,167,019 | B2 | 1/2007 | Broyde et al. |
| 7,180,949 | B2 | 2/2007 | Kleveland et al. |
| 7,184,483 | B2 | 2/2007 | Rajan |
| 7,269,212 | B1 | 9/2007 | Chau et al. |
| 7,335,976 | B2 | 2/2008 | Chen |
| 7,356,213 | B1 | 4/2008 | Cunningham et al. |
| 7,358,869 | B1 | 4/2008 | Chiarulli et al. |
| 7,362,130 | B2 | 4/2008 | Broyde et al. |
| 7,370,264 | B2 | 5/2008 | Worley |
| 7,389,333 | B2 | 6/2008 | Moore et al. |
| 7,400,276 | B1 | 7/2008 | Sotiriadis |
| 7,428,273 | B2 | 9/2008 | Foster |
| 7,456,778 | B2 | 11/2008 | Werner et al. |
| 7,462,956 | B2 | 12/2008 | Lan |
| 7,535,957 | B2 | 5/2009 | Ozawa |
| 7,570,704 | B2 | 8/2009 | Nagarajan |
| 7,599,390 | B2 | 10/2009 | Pamarti |
| 7,620,116 | B2 | 11/2009 | Bessios |
| 7,633,850 | B2 | 12/2009 | Ahn |
| 7,643,588 | B2 | 1/2010 | Visalli |
| 7,656,321 | B2 | 2/2010 | Wang |
| 7,694,204 | B2 | 4/2010 | Schmidt |
| 7,697,915 | B2 | 4/2010 | Behzad |
| 7,706,456 | B2 | 4/2010 | Laroia et al. |
| 7,706,524 | B2 | 4/2010 | Zerbe |
| 7,746,764 | B2 | 6/2010 | Rawlins et al. |
| 7,787,572 | B2 | 8/2010 | Scharf et al. |
| 7,804,361 | B2 | 9/2010 | Lim |
| 7,808,883 | B2 | 10/2010 | Green |
| 7,841,909 | B2 | 11/2010 | Murray |
| 7,869,497 | B2 | 1/2011 | Benvenuto |
| 7,869,546 | B2 | 1/2011 | Tsai |
| 7,882,413 | B2 | 2/2011 | Chen et al. |
| 7,907,676 | B2 | 3/2011 | Stojanovic |
| 7,933,770 | B2 | 4/2011 | Kruger et al. |
| 8,030,999 | B2 | 10/2011 | Chatterjee |
| 8,036,300 | B2 | 10/2011 | Evans |
| 8,050,332 | B2 | 11/2011 | Chung |
| 8,064,535 | B2 | 11/2011 | Wiley |
| 8,085,172 | B2 | 12/2011 | Li |
| 8,091,006 | B2 | 1/2012 | Prasad et al. |
| 8,149,906 | B2 | 4/2012 | Saito |
| 8,159,375 | B2 | 4/2012 | Abbasfar |
| 8,159,376 | B2 | 4/2012 | Abbasfar |
| 8,185,807 | B2 | 5/2012 | Oh et al. |
| 8,199,863 | B2 | 6/2012 | Chen |
| 8,218,670 | B2 | 7/2012 | Abou Rjeily |
| 8,245,094 | B2 | 8/2012 | Jiang |
| 8,253,454 | B2 | 8/2012 | Lin |
| 8,279,094 | B2 | 10/2012 | Abbasfar |
| 8,406,315 | B2 | 3/2013 | Tsai |
| 8,429,495 | B2 | 4/2013 | Przybylski |
| 8,442,099 | B1 | 5/2013 | Sederat |
| 8,442,210 | B2 | 5/2013 | Zerbe |
| 8,443,223 | B2 | 5/2013 | Abbasfar |
| 8,451,913 | B2 | 5/2013 | Oh |
| 8,462,891 | B2 | 6/2013 | Kizer et al. |
| 8,498,344 | B2 | 7/2013 | Wilson |
| 8,498,368 | B1 | 7/2013 | Husted |
| 8,520,493 | B2 | 8/2013 | Goulahsen |
| 8,539,318 | B2 | 9/2013 | Cronie |
| 8,547,272 | B2 | 10/2013 | Nestler et al. |
| 8,577,284 | B2 | 11/2013 | Seo et al. |
| 8,588,254 | B2 | 11/2013 | Diab |
| 8,588,280 | B2 | 11/2013 | Oh et al. |
| 8,593,305 | B1 | 11/2013 | Tajalli et al. |
| 8,620,166 | B2 | 12/2013 | Guha |
| 8,638,241 | B2 | 1/2014 | Sudhakaran |
| 8,649,445 | B2 | 2/2014 | Cronie |
| 8,649,460 | B2 | 2/2014 | Ware et al. |
| 8,649,556 | B2 | 2/2014 | Wedge |
| 8,687,968 | B2 | 4/2014 | Nosaka |
| 8,711,919 | B2 | 4/2014 | Kumar |
| 8,718,184 | B1 | 5/2014 | Cronie |
| 8,773,964 | B2 | 7/2014 | Hsueh |
| 8,780,687 | B2 | 7/2014 | Clausen |
| 8,782,578 | B2 | 7/2014 | Tell |
| 8,831,440 | B2 | 9/2014 | Yu |
| 8,879,660 | B1 | 11/2014 | Peng |
| 8,897,134 | B2 | 11/2014 | Kern |
| 8,949,693 | B2 | 2/2015 | Ordentlich |
| 8,951,072 | B2 | 2/2015 | Hashim |
| 8,989,317 | B1 | 3/2015 | Holden |
| 9,015,566 | B2 | 4/2015 | Cronie |
| 9,036,764 | B1 | 5/2015 | Hossain |
| 9,059,816 | B1 | 6/2015 | Simpson |
| 9,069,995 | B1 | 6/2015 | Cronie |
| 9,093,791 | B2 | 7/2015 | Liang |

(56) References Cited

U.S. PATENT DOCUMENTS

| | | |
|---|---|---|
| 9,100,232 B1 | 8/2015 | Hormati |
| 9,106,465 B2 | 8/2015 | Walter |
| 9,124,557 B2 | 9/2015 | Fox et al. |
| 9,172,412 B2 | 10/2015 | Kim |
| 9,281,785 B2 | 3/2016 | Sjoland |
| 9,288,082 B1* | 3/2016 | Ulrich .................. H04L 25/02 |
| 9,331,962 B2 | 5/2016 | Lida |
| 9,362,974 B2 | 6/2016 | Fox |
| 9,374,250 B1 | 6/2016 | Musah |
| 2002/0044316 A1 | 4/2002 | Myers |
| 2002/0057592 A1 | 5/2002 | Robb |
| 2002/0154633 A1 | 10/2002 | Shin |
| 2002/0163881 A1 | 11/2002 | Dhong |
| 2002/0174373 A1 | 11/2002 | Chang |
| 2003/0086366 A1 | 5/2003 | Branlund |
| 2003/0146783 A1 | 8/2003 | Bandy et al. |
| 2004/0003336 A1 | 1/2004 | Cypher |
| 2004/0003337 A1 | 1/2004 | Cypher |
| 2004/0151235 A1* | 8/2004 | Olson .................. H04B 1/7103 375/148 |
| 2004/0156432 A1 | 8/2004 | Hidaka |
| 2005/0152385 A1 | 7/2005 | Cioffi |
| 2005/0174841 A1 | 8/2005 | Ho |
| 2005/0213686 A1 | 9/2005 | Love et al. |
| 2006/0115027 A1 | 6/2006 | Srebranig |
| 2006/0133538 A1 | 6/2006 | Stojanovic |
| 2006/0233281 A1* | 10/2006 | Chen et al. .................. 375/299 |
| 2007/0159958 A1 | 7/2007 | Ahn |
| 2007/0194848 A1 | 8/2007 | Bardsley |
| 2007/0263711 A1 | 11/2007 | Kramer et al. |
| 2007/0265533 A1 | 11/2007 | Tran |
| 2008/0013622 A1 | 1/2008 | Bao |
| 2008/0043677 A1* | 2/2008 | Kim et al. .................. 370/332 |
| 2008/0104374 A1 | 5/2008 | Mohamed |
| 2008/0159448 A1 | 7/2008 | Anim-Appiah et al. |
| 2008/0284524 A1 | 11/2008 | Kushiyama |
| 2009/0059782 A1 | 3/2009 | Cole |
| 2009/0092196 A1 | 4/2009 | Okunev |
| 2009/0185636 A1 | 7/2009 | Palotai et al. |
| 2009/0251222 A1 | 10/2009 | Khorram |
| 2010/0023838 A1 | 1/2010 | Shen |
| 2010/0046644 A1 | 2/2010 | Mazet |
| 2010/0180143 A1 | 7/2010 | Ware et al. |
| 2010/0205506 A1 | 8/2010 | Hara |
| 2010/0208676 A1* | 8/2010 | Li .................. H04L 5/0007 370/329 |
| 2010/0296556 A1 | 11/2010 | Rave |
| 2011/0072330 A1 | 3/2011 | Kolze |
| 2011/0150495 A1 | 6/2011 | Nosaka |
| 2011/0268225 A1 | 11/2011 | Cronie et al. |
| 2011/0291758 A1 | 12/2011 | Hsieh |
| 2011/0299555 A1 | 12/2011 | Cronie et al. |
| 2012/0008662 A1 | 1/2012 | Gardiner |
| 2012/0152901 A1 | 6/2012 | Nagorny |
| 2012/0161945 A1 | 6/2012 | Single |
| 2012/0257683 A1 | 10/2012 | Schwager |
| 2013/0010892 A1 | 1/2013 | Cronie et al. |
| 2013/0049863 A1 | 2/2013 | Chiu |
| 2013/0051162 A1 | 2/2013 | Amirkhany et al. |
| 2013/0229294 A1 | 9/2013 | Matsuno |
| 2014/0132331 A1 | 5/2014 | Gonzalez Diaz |
| 2014/0198841 A1 | 7/2014 | George |
| 2014/0226455 A1 | 8/2014 | Schumacher |
| 2015/0010044 A1 | 1/2015 | Zhang |
| 2015/0078479 A1 | 3/2015 | Whitby-Strevens |
| 2015/0146771 A1 | 5/2015 | Walter |
| 2015/0199543 A1 | 7/2015 | Winoto |
| 2015/0333940 A1 | 11/2015 | Shokrollahi |
| 2015/0381232 A1 | 12/2015 | Ulrich |
| 2016/0020796 A1 | 1/2016 | Hormati |
| 2016/0020824 A1 | 1/2016 | Ulrich |
| 2016/0036616 A1 | 2/2016 | Holden |

FOREIGN PATENT DOCUMENTS

| | | |
|---|---|---|
| JP | 2003163612 | 6/2003 |
| WO | 2009084121 | 7/2009 |
| WO | 2010031824 | 3/2010 |
| WO | 2011119359 | 9/2011 |

OTHER PUBLICATIONS

International Search Report and Written Opinion for PCT/EP2011/059279, mailed Sep. 22, 2011, 9 pages.

International Search Report and Written Opinion of the International Searching Authority, mailed Nov. 5, 2012, in International Patent Application S.N. PCT/EP2012/052767, 7 pages.

International Search Report and Written Opinion of the International Searching Authority, mailed Jul. 14, 2011 in International Patent Application S.N. PCT/EP2011/002170, 10 pages.

Healey, A., et al., "A Comparison of 25 Gbps NRZ & PAM-4 Modulation used in Legacy & Premium Backplane Channels", DesignCon 2012, 16 pages.

International Search Report for PCT/US2014/053563, dated Nov. 11, 2014, 2 pages.

Clayton, P., "Introduction to Electromagnetic Compatibility", Wiley-Interscience, 2006.

She et al., "A Framework of Cross-Layer Superposition Coded Multicast for Robust IPTV Services over WiMAX," IEEE Communications Society subject matter experts for publication in the WCNC 2008 proceedings, Mar. 31, 2008-Apr. 3, 2008, pp. 3139-3144.

Poulton, et al., "Multiwire Differential Signaling", UNC-CH Department of Computer Science Version 1.1, Aug. 6, 2003.

Skliar et al., A Method for the Analysis of Signals: the Square-Wave Method, Mar. 2008, Revista de Matematica: Teoria y Aplicaciones, pp. 09-129.

International Search Report and Written Opinion from PCT/US2014/034220 mailed Aug. 21, 2014.

International Search Report and Written Opinion for PCT/US14/052986 mailed Nov. 24, 2014.

Burr, "Spherical Codes for M-ARY Code Shift Keying", University of York, Apr. 2, 1989, pp. 67-72, United Kingdom.

Slepian, D., "Premutation Modulation", IEEE, vol. 52, No. 3, Mar. 1965, pp. 228-236.

Stan, M., et al., "Bus-Invert Coding for Low-Power I/O, IEEE Transactions on Very Large Scale Integration (VLSI) Systems", vol. 3, No. 1, Mar. 1995, pp. 49-58.

Tallini, L., et al., "Transmission Time Analysis for the Parallel Asynchronous Communication Scheme", IEEE Tranactions on Computers, vol. 52, No. 5, May 2003, pp. 558-571.

International Search Report and Written Opinion for PCT/EP2012/052767 mailed May 11, 2012.

Notification of Transmittal of the International Search Report and the Written Opinion of the International Searching Authority, or the Declaration, for PCT/US2015/041161, dated Oct. 7, 2015, 8 pages.

International Search Report and Written Opinion for PCT/EP2011/074219 mailed Jul. 4, 2012.

Notification of Transmittal of the International Search Report and the Written Opinion of the International Searching Authority, or The Declaration for PCT/EP2013/002681, dated Feb. 25, 2014, 15 pages.

Ericson, T., et al., "Spherical Codes Generated by Binary Partitions of Symmetric Pointsets", IEEE Transactions on Information Theory, vol. 41, No. 1, Jan. 1995, pp. 107-129.

Farzan, K., et al., "Coding Schemes for Chip-to-Chip Interconnect Applications", IEEE Transactions on Very Large Scale Integration (VLSI) Systems, vol. 14, No. 4, Apr. 2006, pp. 393-406.

Abbasfar, A., "Generalized Differential Vector Signaling", IEEE International Conference on Communications, ICC '09, (Jun. 14, 2009), pp. 1-5.

Dasilva et al., "Multicarrier Orthogonal CDMA Signals for Quasi-Synchronous Communication Systems", IEEE Journal on Selected Areas in Communications, vol. 12, No. 5 (Jun. 1, 1994), pp. 842-852.

(56) References Cited

OTHER PUBLICATIONS

Wang et al., "Applying CDMA Technique to Network-on-Chip", IEEE Transactions on Very Large Scale Integration (VLSI) Systems, vol. 15, No. 10 (Oct. 1, 2007), pp. 1091-1100.
Cheng, W., "Memory Bus Encoding for Low Power: A Tutorial", Quality Electronic Design, IEEE, International Symposium on Mar. 26-28, 2001, pp. 199-204, Piscataway, NJ.
Brown, L., et al., "V.92: The Last Dial-Up Modem?", IEEE Transactions on Communications, IEEE Service Center, Piscataway, NJ., USA, vol. 52, No. 1, Jan. 1, 2004, pp. 54-61. XP011106836, ISSN: 0090-6779, DOI: 10.1109/tcomm.2003.822168, pp. 55-59.
Notification of Transmittal of International Search Report and The Written Opinion of the International Searching Authority, for PCT/US2015/018363, mailed Jun. 18, 2015, 13 pages.
Counts, L., et al., "One-Chip Slide Rule Works with Logs, Antilogs for Real-Time Processing," Analog Devices Computational Products 6, Reprinted from Electronic Design, May 2, 1985, 7 pages.
Design Brief 208 Using the Anadigm Multiplier CAM, Copyright 2002 Anadigm, 6 pages.
Grahame, J., "Vintage Analog Computer Kits," posted on Aug. 25, 2006 in Classic Computing, 2 pages, http.//www.retrothing.com/2006/08/classic_analog_.html.
Schneider, J., et al., "ELEC301 Project: Building an Analog Computer," Dec. 19, 1999, 8 pages, http://www.clear.rice.edu/elec301/Projects99/anlgcomp/.
Tierney, J., et al., A digital frequency synthesizer, Audio and Electroacoustics, IEEE Transactions, Mar. 1971, pp. 48-57, vol. 19, Issue 1, 1 page Abstract from http://ieeexplore.
"Introduction to: Analog Computers and the DSPACE System," Course Material ECE 5230 Spring 2008, Utah State University, www.coursehero.com, 12 pages.
Notification of Transmittal of The International Search Report and the Written Opinion of the International Searching Authority, or the Declaration, for PCT/US2014/015840, dated May 20, 2014. 11 pages.
Notification of Transmittal of The International Search Report and The Written Opinion of the International Searching Authority, or the Declaration, for PCT/US2014/043965, dated Oct. 22, 2014, 10 pages.
Notification of Transmittal of The International Search Report and The Written Opinion of the International Searching Authority, or The Declaration, dated Mar. 3, 2015, for PCT/US2014/066893, 9 pages.
Loh, M., et al., "A 3×9 Gb/s Shared, All-Digital CDR for High-Speed, High-Density I/O", Matthew Loh, IEEE Journal of Solid-State Circuits, Vo. 47, No. 3, Mar. 2012.
Jiang, A., et al., "Rank Modulation for Flash Memories", IEEE Transactions of Information Theory, Jun. 2006, vol. 55, No. 6, pp. 2659-2673.
Zouhair Ben-Neticha et al, "The streTched-Golay and other codes for high-SNR finite-delay quantization of the Gaussian source at 1/2 Bit per sample", IEEE Transactions on Communications, vol. 38, No. 12 Dec. 1, 1990, pp. 2089-2093, XP000203339, ISSN: 0090-6678, DOI: 10.1109/26.64647.
Oh, et al., Pseudo-Differential Vector Signaling for Noise Reduction in Single-Ended Signaling, DesignCon 2009.
Notification of Transmittal of the International Search Report and the Written Opinion of the International Searching Authority, or the Declaration, for PCT/US2015/043463, dated Oct. 16, 2015, 8 pages.
Notification of Transmittal of the International Search Report and The Written Opinion of the International Searching Authority, or the Declaration, for PCT/US2015/039952, dated Sep. 23, 2015, 8 pages.

\* cited by examiner

ERROR CONTROL CODING FOR ORTHOGONAL DIFFERENTIAL VECTOR SIGNALING

CROSS-REFERENCE TO RELATED APPLICATIONS

This application claims the benefit of U.S. Provisional Application No. 61/351,845, filed Jun. 4, 2010, titled "Error Control Coding for Orthogonal Differential Vector Signaling,", the contents of which are hereby incorporated in its entirety by reference.

This application also incorporates in its entirety by reference, for all purposes, the following:

U.S. Pat. No. 9,288,089, issued Mar. 15, 2016, filed May 20, 2010, naming Harm Cronie and Amin Shokrollahi, and entitled "Orthogonal Differential Vector Signaling" (referred to herein as "CS-1").

FIELD OF THE INVENTION

The present invention relates to communications in general and in particular to transmission of signals capable of conveying information.

BACKGROUND

Chip-to-chip communication is a central aspect of electronic devices. An example is a processor that is connected to a memory interface where communication takes place between chips located in the same device. Another example is a television that is connected to the digital output of a set-top box. In this case, the two chips communicating are located in different devices. A third example is system-on-chip communications, where multiple chips are integrated into a single package and communication takes place between the chips in the same package.

Communication between these chips can take place over several different transmission media. A single unit of such a transmission medium able to carry information is referred to herein as a "wire" but this is to be understood generally. Chips contained within a single device might be mounted on a printed circuit board (PCB) or packaged together. In the first case, the wires usually take the form of microstrip or stripline traces on a PCB. In the latter case, there are several options to connect the chips. For chips located in two different devices, the wires can be physical copper wires or optical fibers. Often multiple wires are bundled into a communication bus to increase the total bandwidth.

In such chip-to-chip communication systems, the particular configuration can really affect power consumption, speed of communication, error-performance, bus width and noise resilience. There are several important trade-offs. Increasing the power consumption of the bus can lead to better error performance and noise resilience. However, low power consumption is preferred in most electronic devices, more so when the device runs on a battery. By using a larger bus width, the total transfer rate can be increased. However, a larger bus width may require the chip to contain more pins, which can be a problem since pins are often a scarce resource.

To signal over a bus, a signaling method is used. This signaling method generates a signal for each wire of the bus based on digital information. A commonly used signaling method is single-ended signaling. Single-ended signaling is not very resilient against noise and half of the transmission power is wasted in a DC component of the transmitted signal. An alternative to single-ended signaling is differential signaling. Differential signaling provides good noise resilience and is more efficient in power compared to single-ended signaling. Examples of systems that employ differential signaling are RS-422, RS-485, twisted-pair Ethernet, DVI and HDMI. The downside of differential signaling is that it conventionally requires twice as many wires than signals that are transmitted on the bus.

In chip-to-chip communications, there are several sources of noise, such as: (a) common-mode noise (noise and interference that is common to the whole bus); (b) independent noise that is added to each of the wires of the bus individually; and (c) simultaneous switching output ("SSO") noise, which is caused by variations in the current through the circuits driving the wires of the bus.

Single-ended signaling is sensitive to common-mode noise and introduces SSO noise. Differential signaling is a good alternative that does not suffer from these two issues. Furthermore, differential signaling is more efficient in terms of the power required to achieve a given error performance. However, differential signaling conventionally requires twice the number of wires than bits transmitted on the bits per time interval. Furthermore, a substantial amount of transmission power is required to assure a good error and noise performance.

Orthogonal Differential Vector Signaling ("ODVS"), as disclosed CS-1 for example, describes a method that has similar noise performance as differential signaling and can provide pin efficiencies close to single-ended signaling. In some embodiments described in CS-1, this is achieved by transforming the incoming signals using an orthogonal or unitary transformation.

In many applications, it is preferable to increase the noise resilience of a communications system, as described above, at the expense of the pin-efficiency. Where differential signaling is used, pin-efficiency is sacrificed to obtain a high resilience to certain types of errors. Where ODVS is used, the pin-efficiency is increased while maintaining the resilience of the transmission against similar amounts of noise as in differential signaling.

However, sometimes even better performance is needed for chip-to-chip signaling where power consumption is limited and/or pin availability is limited.

BRIEF SUMMARY

This Brief Summary of the Invention is provided to introduce a selection of concepts in a simplified form that are further described below in the Detailed Description of the Invention. This Brief Summary of the Invention is not intended to identify key or essential features of the claimed subject matter, nor is it intended to be used as an aid in determining the scope of the claimed subject matter. Other objects and/or advantages of the present invention will be apparent to one of ordinary skill in the art upon review of the Detailed Description of the Invention and the included figures.

In one embodiment, circuits for transmitting information between devices over a bus and are constrained by pin-efficiency requirements, power usage requirements, or the like, use transformed signals that are transformed using a non-simple matrix, i.e., a matrix that is orthogonal and has size greater than two. The input signals to be conveyed are received by a bus driving circuit as a first plurality of physical signals representing information to be conveyed. A second plurality of physical signals is generated, at least in part, based on the first plurality of physical signals, wherein the second plurality of physical signals comprises at least one more signal than the number of signals in the first plurality of physical signals. The bus driving circuit then generates a third plurality of physical signals based, at least in part, on the second set of physical signals and the non-simple matrix. That third plurality of physical signals is provided to the data bus being driven, the data bus comprising a plurality of wires capable of conveying a distinct signal. The devices connected by the bus can include chips on a common substrate, chips on separate substrates, but a common circuit board, chips on distinct circuit boards but within a common enclosure, and/or chips in distinct enclosures.

In a preferred embodiment, the number of signals in the first plurality of physical signals is greater than half the number of wires of the data bus.

The following detailed description together with the accompanying drawings will provide a better understanding of the nature and advantages of the present invention.

BRIEF DESCRIPTION OF THE DRAWINGS

Various embodiments in accordance with the present disclosure will be described with reference to the drawings, in which.

DETAILED DESCRIPTION

Improved signaling system and methods are described herein. In specific embodiments, bus communications between circuits is provided by a data bus that has a plurality of wires to convey signals, wherein the wires carry some form of electromagnetic energy, such as voltage and/or current over conducting metal or semiconductor material, light waves over fiber optic lines, or the like. A bus driver on one portion of the bus will drive signals that correspond to the information and/or data to be sent, while a corresponding bus driver on another portion of the bus will receive and transform those signals. Unlike conventional bus drivers, such as single-ended signaling and differential signaling, the signaling used by the bus drivers described herein can provide better combinations of pin-efficiency and average power requirements, without requiring complex processing (which can use up more than the power that is saved in the first place).

More specific embodiments are described below, but in one case, a bus output driver takes in a plurality of data signals, encodes the data signals into a set of numerical values or their electrical representations, vector encodes those numerical values using a non-simple matrix, i.e., a matrix that is orthogonal (or unitary) with a size greater than 2×2, and generates corresponding bus levels to apply to the wires of the bus. A bus input driver performs the inverse.

While it is known that error correction can be used to improve reliability of communications in the face of channel noise or other distortions, often error correction can be complicated and can take up more power and computing effort than is typically available for chip-to-chip communications. For example, error correction could be added by using a computer at one end of a channel to generate error correction symbols, send those with the data and have a computing process at the receiver compute the likely values for the sent data using the error correction symbols that were received. Unfortunately, this might introduce delays and require much more power and chip real estate than if a straight connection is made from chip to chip at a higher power level and well as being its own source of noise.

Figure 1:
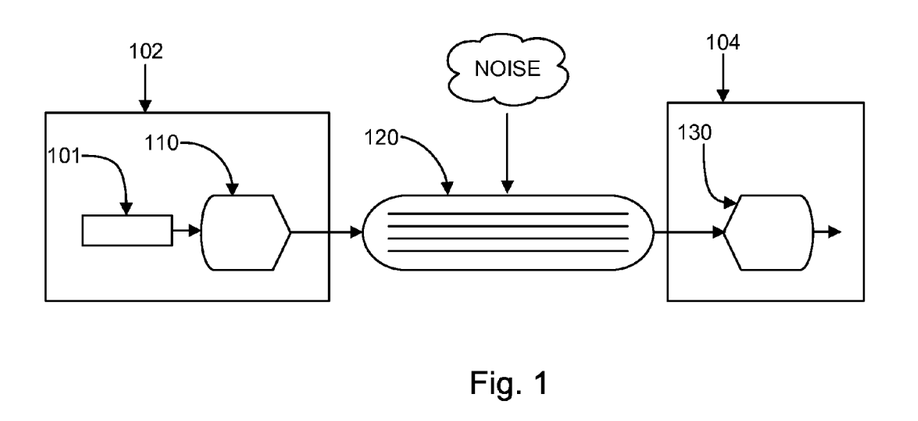
FIG. 1 is a schematic diagram depicting aspects of an example communication in accordance with at least one embodiment of the invention.

FIG. 1 illustrates a general model of communication between two devices 102 and 104 on a bus 120 used for communications. The signals transmitted on bus 120 can be disturbed by noise or other channel effects. Bus 120 is an example of a medium on which signal transmission can take place. Bus 120 is shown comprising several wires that can be used to transmit information. The information to be transmitted may be stored in an information storage medium 101, or it may be available substantially concurrently with the transmission, as might be the case in data streaming or where the operation of one chip is dependent on values received from another chip.

For the purposes of this disclosure, and for reasons of brevity, we assume herein that the information is available in binary form as bits, but this is not necessary for implementing the teachings of this disclosure. Similar methods as the ones taught herein may be used when the information is available in a form other than binary signals or values, such as tertiary values or the like. In some cases, the data is represented by multiple bits. In any case, the input data might be converted to real or complex numbers, which might be a logical operation only, and then those numbers further processed. In some cases, the processing of numbers is done by circuitry. For example, two and one can be added by applying one unit of current to a node from one wire and two units of current to the node from another wire and having an output wire from that node be the "sum" wire, which might be expected to carry three units of current. Voltages can also be used to represent numbers, as well as discrete values, as is commonly known. Where complex numbers are represented, they might be represented by a signal that has an amplitude and phase, as is also well-known.

Returning to FIG. 1, the information in the form of bits or a signal representing the information is input into a transformer 110. A task of transformer 110 is to transform the information in such a way that it can be transmitted via bus 120. For example, transformer 110 could be generating a sequence of waveforms corresponding to the individual bits of the information in information storage medium 101. An example of such a waveform is non-return-to-zero ("NRZ") signaling wherein a signal can take on one of two values (sometimes herein referred to as a "logical 0" and "a logical 1") that represented by signal levels that are level over a time interval, or cycle, of T seconds. The amplitude of the signal levels usually correspond to a physical quantity, such as a current or voltage, and are amplitude modulation.

The process of representing information as a physical signal is referred to as modulation. Other types of modulation beyond amplitude modulation can also be applied to the present disclosure, for example, modulation by frequency, or by signal phase. Transformer 110 can include signal amplification, signal filtering and/or other suitable signal processing functions devised to prepare the signal for a transport medium of bus 120. In addition to this, the task of the transformer may include creating a different set of signals from which the original signals can be recovered, and which are resistant to various types of noise on bus 120. Example operations of transformer 110 in accordance with at least one embodiment of the invention are described in greater detail below.

Once the signal input into transformer 110 is transformed, it can be transmitted on bus 120. Each of the wires of the bus may be capable of transmitting one or more bits of information at a time, such as by transmitting a signal selected from a set of two or more options determined by the information. The signals transmitted on bus 120 might be subjected to noise that causes degradation or corruption of those signals.

Herein, the term "pin-efficiency" is used as a measure of how well a bus utilizes its wires. One metric of pin-efficiency is in considering a bus that has time intervals, T, each of which is used to provide a number of information bits in the form of signals over the wires of the bus during that time interval, and the pin-efficiency of the bus is the to ratio of the number of information bits that are transmitted during one time interval T and the number of wires of the bus. As an example, if a bus transmits k bits of information over the bus's l wires in each s millisecond interval then moves on to the next k bits of information, the pin-efficiency of the bus is k/l. In a specific example, wherein bits are transmitted over separate wires with no processing or interaction, and the levels on those wires are binary, then k bits can be conveyed in an interval over those l wires, so the pin-efficiency would be 1.0, or 100%. In another specific example, if bits are transmitted using differential signaling with no processing or interaction, and the levels on those wires are binary, but the signal on one wire of a pair is entirely determined by the signal on the other wire of the pair (such as its inverse or opposite), then l bits can be conveyed in an interval over 2l wires, and that scenario's pin-efficiency would be 1/2l=0.5, or 50%.

All other aspects being equal, a system that supports a higher pin-efficiency is typically preferred over one with a lower pin-efficiency. As an example, single-ended signaling with the same noise performance as differential signaling would be preferred, since single-ended signaling has a higher pin-efficiency. However, as explained above, and as is well-known, basic single-ended signaling and differential signaling are not in "all aspects equal."

Once the signal is transmitted on bus 120, it might enter a detransformer 130. A task of detransformer 130 includes reconstructing the original information in the information storage medium 101 and/or the signal representing this information. Once the signals leave the detransformer 130, they may be transported to one or more further units in the communication path for further processing. Such further units could include another bus, or they could include any other part of the communication path in need of the information.

Yet another important property of the bus is the power required to transmit the information on the bus such that the detransformer can successfully recover the original information in 101 or the signal representing this information. The amount of power required can depend on the signaling scheme implemented by the transformer and the noise conditions. All other aspects being equal, a transformer for which the power consumption is less is preferred over one in which the power consumption is higher.

Figure 2:
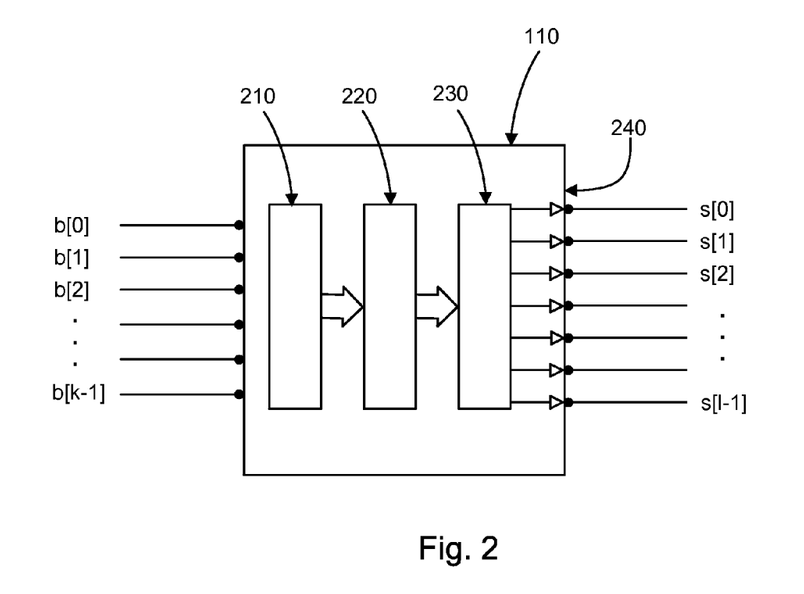
FIG. 2 is a schematic diagram depicting aspects of an example transformer in accordance with at least one embodiment of the invention.

FIG. 2 illustrates a first example of a transformer 110. A sequence of k information bits b[0], . . . , b[k−1] is input to the transformer 110. This process might repeat for each time interval T, but the description here will focus on a single interval, for clarity. Transformer 110 might comprise an information encoder 210, a vector signal encoder 220 and a signal generator 230. One task of information 210 encoder is to map the k input bits b[0], . . . , b[k−1] to n elements that may be represented by real or complex numbers (i.e., values, signals, or other representations). These n numbers are fed to vector signal encoder 220, which generates l real or complex numbers. These l numbers are input as signals or data to signal generator 230, which converts these numbers to l physical signals that have a form suitable for transmission on the particular wires being used, such as currents, voltages, light, etc. of suitable modulation. These physical signals may be fed to a set of bus drivers 240 whose task may be to amplify these signals and/or perform filtering of the signals on l wires and then transmitting them. The elements denoted by s[0], . . . , s[l−1] in FIG. 2 represent the signals transmitted on the wires of bus 120.

Figure 3:
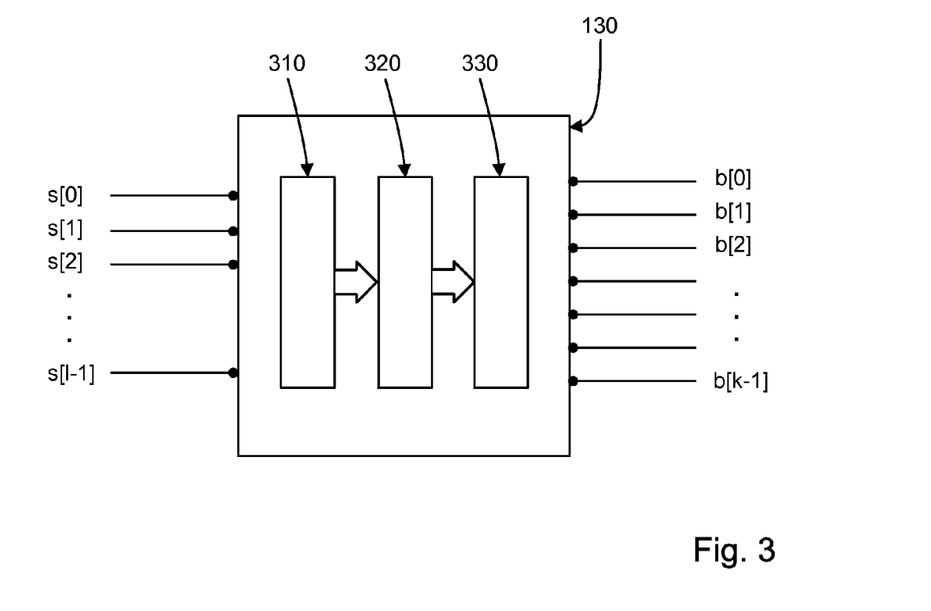
FIG. 3 is a schematic diagram depicting aspects of an example detransformer in accordance with at least one embodiment of the invention.

An example of a general detransformer 130 is shown in FIG. 3. Detransformer 130 is shown comprising a bus receiver 310 that receives the signals from the bus. Bus receiver 310 might perform additional tasks, such as amplification, filtering, equalization, and crosstalk cancellation. The output of the bus receiver is fed to a vector signal decoder 320, which performs the inverse of the encoding done by vector signal encoder 220. The output of vector signal decoder 320 is fed to an information decoder 330, which reconstructs the original b[0], . . . , b[k−1] input bits, if possible. Reconstruction might itself not fully detect and correct errors, but that might be handled at the consumer of the data or at a higher level in a communications system, or not.

Figure 4:
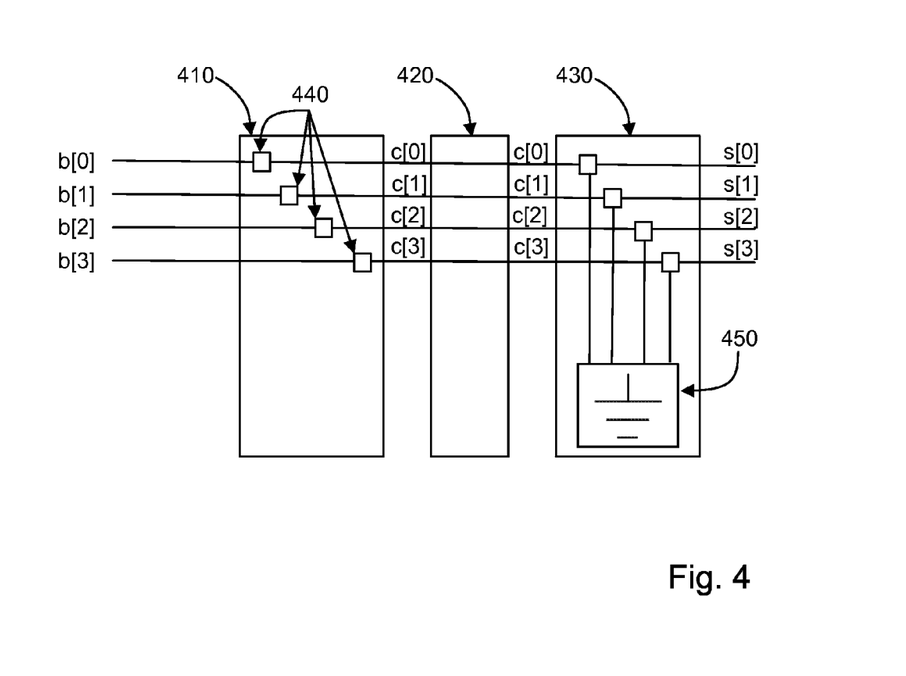
FIG. 4 is a schematic diagram depicting aspects of example components facilitating single-ended signaling.

FIG. 4 depicts aspects of example components facilitating single-ended signaling. In this example, a set of four source bits b[0], . . . , b[3] is to be transmitted on a bus comprising four wires. The source bits b[0], . . . , b[3] are converted to the sequence of real numbers c[0], . . . , c[3] by information encoder 410. To exemplify the process, a logical "0" is mapped to a number a and a logical "1" is mapped to "0", though several other possibilities may also be acceptable. In a more general form, a logical "0" is mapped to V+a and a logical "1" is mapped to V. Units 440 perform the actual conversion from bits to the real numbers and units can be hardware circuits or program elements. In this setting, each c[i] only depends on the corresponding b[i] for i=0, . . . , 3.

The four real numbers c[0], . . . , c[3] are forwarded to a vector signal encoder 420, which need not perform any task in single-ended signaling and forwards c[0], . . . , c[3] to a signal generator 430. Signal generator 430 creates a set of physical signals s[0], . . . , s[3] for each wire, based on c[0], . . . , c[3]. In single-ended signaling, this physical signal is defined with respect to a common reference 450, which is usually ground when the signals are electrical signals. This may mean that the current or voltage signals on the wires are relative to the reference's voltage and/or current.

There are several methods to encode c[0], . . . , c[3] into a physical signal, which can be implemented in structures with the elements shown in straightforward ways. A notion of time is usually used, which means that the bits are to be transmitted in an interval of T seconds for some integer or noninteger T. A common signal in single-ended signaling for chip-to-chip communications is a non-return-to-zero ("NRZ") signal. An NRZ signal is a signal for which the amplitude of the signal is equal to a value of a for a duration of T seconds when the bit is "0" and equal to a zero amplitude when the bit is "1". When the signals used by signal generator 230 are NRZ signals, the amplitude of the signal for wire i is set to c[i] for a duration of T seconds. The pin-efficiency of single-ended signaling is 1.0, or 100%. However, single-ended signaling suffers from a plurality of noise types, as described in detail in CS-1. A common approach to alleviate these problems is to increase the value of a, thereby increasing the total energy consumption. However, in applications this may lead to other disadvantageous effects (such as battery drain, or induction of noise on other devices).

Figure 5:
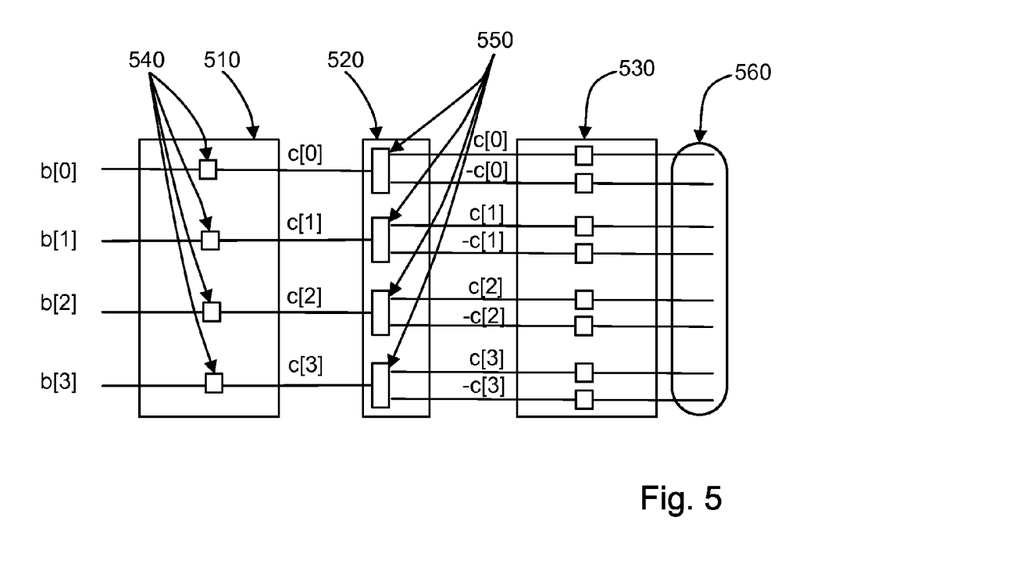
FIG. 5 is a schematic diagram depicting aspects of example components facilitating conventional differential signaling.

FIG. 5 depicts aspects of example components facilitating differential signaling over a bus of wires. In this example, there are four bits b[0], . . . , b[3] to be transmitted over a bus comprising eight bus wires. The bits b[0], . . . , b[3] are fed into an information encoder 510, which maps each of the bits to a real number, resulting in four real numbers c[0], . . . , c[3] that can be output to a vector signal encoder 520. The map is such that a logical "0" is mapped to the number 1 and a logical "1" is mapped to the number −1. The numbers c[0], . . . , c[3] are input to vector signal encoder 520. In differential signaling, each of the numbers c[0], . . . , c[3] is treated independently of the other ones and for each c[i] with i=0, . . . , 3, two outputs are generated from units 550, namely c[i] and −c[i]. These values are forwarded to signal generator 530, which generates a signal suitable for transmission on the wires 560.

The amplitudes of the physical signal for wire $2i$ and wire $2i+1$ are related to c[i]. Units 550 encode the c[i] values into the difference between the signal on wire $2i$ and $2i+1$.

Differential signaling is resistant to some of the noise scenarios discussed in CS-1, for example, it is resistant to common mode noise since the information is encoded as the difference of the amplitudes of the signal of two wires. Differential signaling provides a better resistance to bus noise than single-ended signaling. One of the reasons is that the swing in amplitude is twice as large as in single-ended signaling when the same amount of transmission power is used. As will be apparent to one of skill in the art, in single-ended signaling, some transmission power may be wasted in a DC value of the transmitted signal. Differential signaling does not introduce SSO noise when chip-to-chip communication uses NRZ-like signals. Finally, it is also resistant to reference noise because no external reference is required to reconstruct the original signals. However, differential signaling has the disadvantage that its pin-efficiency is 0.5, or 50%.

Figure 6:
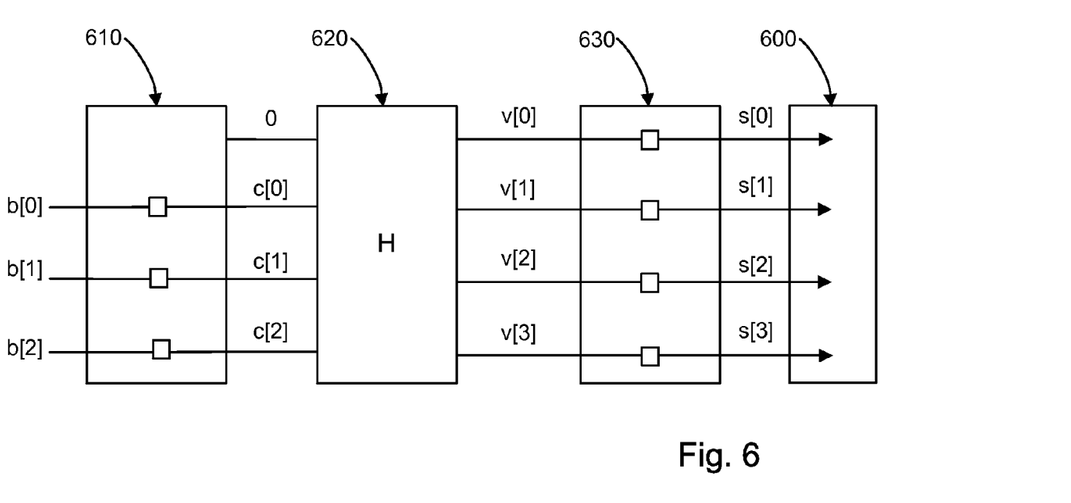
FIG. 6 is a schematic diagram depicting aspects of example components facilitating orthogonal differential vector signaling.

A method which obtains similar advantages as differential signaling while maintaining a high pin-efficiency is Orthogonal Differential Vector Signaling (ODVS), as disclosed in CS-1. FIG. 6 illustrates an example circuit using ODVS that is suitable for a bus 600 comprising four wires. An information encoder 610 takes as its input three bits b[0], . . . , b[2] and generates four outputs. The first output is equal to the real number 0. The other outputs c[0], . . . , c[2] are obtained by mapping the input bits b[0], . . . , b[2] to real numbers. The map used in this example has a logical "0" mapped to the number "1" and a logical "1" mapped to the number −1. If c denotes a vector containing as its first element the first output of information encoder 610 and as its other elements the values c[0], c[1] and c[2], then the output of information encoder 610 is succinctly described by the vector c and it is passed to a vector signal encoder 620. The vector signal encoder 620 applies an orthogonal matrix H of size 4 to the vector c to generate a vector x. In this particular example, the orthogonal matrix may be the Hadamard matrix of size 4 given by Equation 1, with the output of the vector signal encoder 620 given by Equation 2.

$$H = \frac{1}{2}\begin{bmatrix} 1 & 1 & 1 & 1 \\ 1 & -1 & 1 & -1 \\ 1 & 1 & -1 & -1 \\ 1 & -1 & -1 & 1 \end{bmatrix} \quad \text{(Eqn. 1)}$$

$$v = \begin{bmatrix} v[0] \\ v[1] \\ v[2] \\ v[3] \end{bmatrix} = \quad \text{(Eqn. 2)}$$

$$Hc = \frac{1}{2}\begin{bmatrix} 1 & 1 & 1 & 1 \\ 1 & -1 & 1 & -1 \\ 1 & 1 & -1 & -1 \\ 1 & -1 & -1 & 1 \end{bmatrix}\begin{bmatrix} 0 \\ c[0] \\ c[1] \\ c[2] \end{bmatrix} = \frac{1}{2}\begin{bmatrix} c[0] + c[1] + c[2] \\ -c[0] + c[1] - c[2] \\ c[0] - c[1] - c[2] \\ -c[0] - c[1] + c[2] \end{bmatrix}$$

The output of the vector signal encoder 620 is sent to a signal generator 630, which creates a physical signal for each wire of bus 600.

One way to do this is as follows. Signal generator 630 sets the amplitude of the signal for wire i to v[i] for a duration of T seconds and does this for each i. This example of ODVS achieves a similar noise resilience as differential signaling.

However, since three bits are transmitted on four wires, the pin-efficiency is 0.75, or 75%, which is higher than differential signaling.

Figure 7:
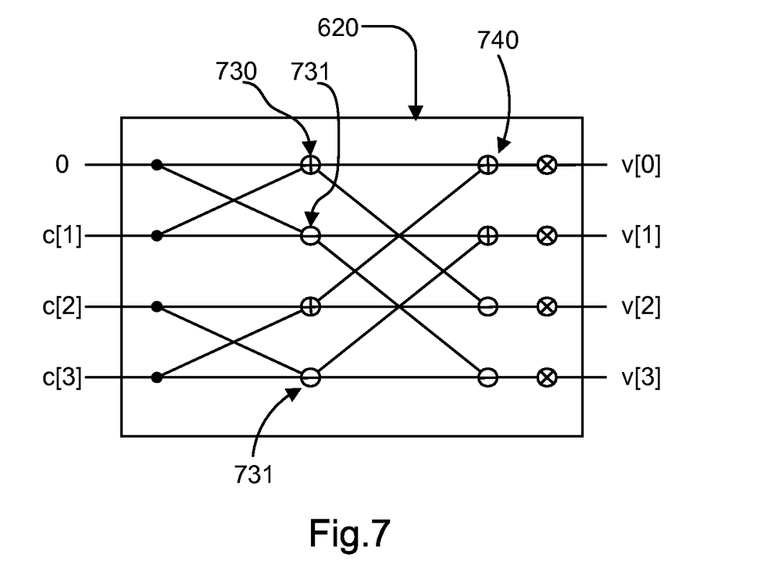
FIG. 7 is a schematic diagram depicting aspects of example components implementing a transform of size four for orthogonal differential vector signaling.

Buses that use larger Hadamard matrices or transforms based on unitary matrices can also be used. As disclosed in CS-1, this leads to a family of ODVS methods with pin-efficiencies between 0.5 and 1. Furthermore, as disclosed in CS-1, Hadamard matrices may have a recursive structure that allows for an efficient computation of the transform. An example of a signal flow graph for the computation of Hc where H is a Hadamard matrix of size 4 is given in FIG. 7. In that figure, vector signal encoder 620 contains units 730 that perform addition and units 731 that perform subtraction. Specifically, a unit 731 may compute the difference of its upper incoming and its lower incoming values. The units 740 multiply the incoming values by 0.5.

ODVS is able to achieve the same noise performance as differential signaling with higher pin-efficiency. However, the required transmit power is similar. In some applications, a lower transmit power may be preferable, at the expense of high pin-efficiency. In other applications, the number of pins may be abundant, for example in legacy systems that already have a physical layout of a bus with many pins. A method that provides a tradeoff between required transmission power and the number of pins used is disclosed in this application. We refer to this method as Coded Vector Signaling ("COVECS").

Figure 8:
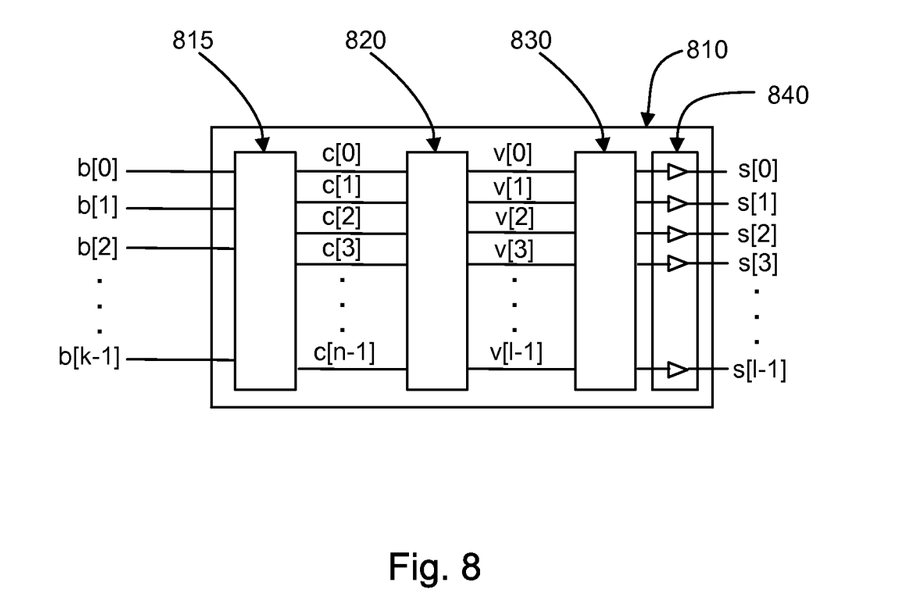
FIG. 8 is a schematic diagram depicting aspects of an example transformer in accordance with at least one embodiment of the invention.

The general operation of a COVECS transformer 810 is exemplified in FIG. 8. The figure shows a transformer for a bus that comprises l wires in total. An information encoder 815 takes as its input k symbols b[0], . . . , b[k−1] from an alphabet S. From these k symbols, the information encoder 815 generates n real or complex numbers c[0], . . . , c[n−1]. Herein, the vector (c[0], . . . , c[n−1]) might be referred to as the "encoding" of the vector (b[0], . . . , b[k−1]) and the mapping that produces the encoding might be referred to as the "encoding map." The number n might be referred to as the "length" of the encoding. In some embodiments of the present invention, the encoding map may be injective, which means that the image of any two different vectors under this map will be different. Moreover, the map used by the information encoder may depend on the width of the original bus, the required protection against noise and the power budget of the bus communication system. Such details might be specified as design constraints.

Information encoder 815 forwards the numbers c[0], . . . , c[n−1] to a vector signal encoder 820 that transforms these n numbers to l real or complex numbers. It should be understood from reading this disclosure that the actions of various elements, blocks, units, etc. described herein might be the result of how the elements, blocks, units, etc. are implemented. For example, "forwarding" might involve setting a voltage on a wire that couples to "forwarder" element, block, unit, etc. to the "forwardee" element, block, unit, etc.

Vector signal encoder 820 may perform its transformation by filling a vector v of size l with c[0], . . . , c[n−1] and possibly other real or complex constants which may be 0. In some embodiments of the present invention, these positions may also be filled with symbols facilitating synchronization and/or equalization. Next, vector signal encoder 820 applies a non-simple orthogonal matrix H to v. As used herein, the term "simple unitary matrix" includes a square matrix of size 1 (i.e., a 1×1 matrix) and complex norm 1, unitary matrices of size 2 and their equivalents, and direct sums (in the sense of group theory) of unitary matrices of size 2 and their equivalents. Also as used herein, the term "non-simple unitary matrix" may refer to a unitary matrix that is not a simple unitary matrix. A non-simple orthogonal transform is defined by a non-simple orthogonal matrix. An example of a family of non-simple orthogonal matrices is the Hadamard matrices of order larger than two. The result, Hv, is sent to a signal generator 830, which generates a sequence of l signals s[0], . . . , s[l−1] for transmission on the bus. In some embodiments, signal generator 830 generates a signal for each wire i generated based on the value of v[i]. The amplitude of s[i] may be set to v[i] for a period of T seconds. Before actual transmission on the bus, a set of drivers 840 may perform additional amplification and/or filtering of the signals.

Figure 9:
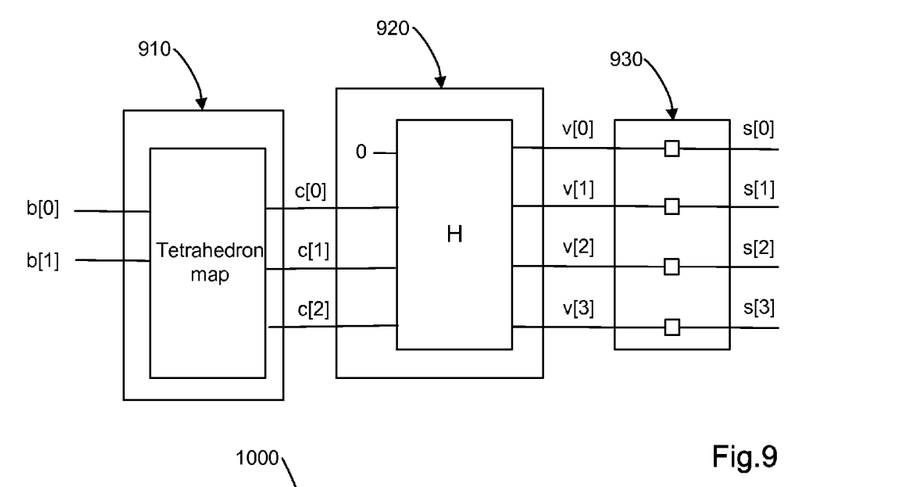
FIG. 9 is a schematic diagram depicting aspects of an example transformer for coded orthogonal differential vector signaling implementing, among other things, a tetrahedron map in accordance with at least one embodiment of the invention.

Using COVECS, the input symbols b[0], . . . , b[k−1] may be bits and information encoder 815 may map these bits to a sequence of real numbers. An example of such an embodiment is illustrated in FIG. 9, showing a COVECS transformer for a bus comprising four wires. Two information bits b[0] and b[1] are input to an information encoder 910. Information encoder applies a tetrahedron map to the two input bits to generate three outputs c[0], . . . , c[2]. Table 1 defines such a tetrahedron map.

TABLE 1

| b[1], b[0] | c[2], c[1], c[0] |
|---|---|
| 0, 0 | −1, −1, −1 |
| 0, 1 | −1, +1, +1 |
| 1, 0 | +1, +1, −1 |
| 1, 1 | +1, −1, +1 |

Based on the input bits b[0] and b[1], information encoder 910 selects and outputs a triple of real numbers that correspond to the corner points of a tetrahedron. The values c[0], . . . , c[2] are fed to a vector signal encoder 920. Vector signal encoder 920 constructs a vector x as in Equation 3 and applies a non-simple orthogonal matrix to x. The non-simple orthogonal matrix may be taken to be a Hadamard matrix of order 4 to obtain a vector v as in Equation 4.

$$x = \begin{bmatrix} 0 \\ c[0] \\ c[1] \\ c[2] \end{bmatrix} \quad \text{(Eqn. 3)}$$

$$v = \begin{bmatrix} v[0] \\ v[1] \\ v[2] \\ v[3] \end{bmatrix} = \frac{1}{2}\begin{bmatrix} 1 & 1 & 1 & 1 \\ 1 & -1 & 1 & -1 \\ 1 & 1 & -1 & -1 \\ 1 & -1 & -1 & 1 \end{bmatrix} x \quad \text{(Eqn. 4)}$$

The components of v are denoted by v[0], v[1], v[2] and v[3], and vector signal encoder 920 forwards these to a signal generator 930 that generates four signals based on v[0], . . . , v[3]. The way this can be done is similar to differential signaling. The amplitude of the signal on wire i may be set to v[i] for a period of T seconds.

The pin-efficiency of the example presented in FIG. 9 is 0.5 or 50%. This is the same as in full differential signaling. Furthermore, common-mode rejection properties are also similar, since ODVS is used. However, compared to differential signaling, the tetrahedron map requires less transmission power to obtain the same error-performance under noise. One skilled in the art will recognize after reading this disclosure that the error performance under noise is related to the Euclidean distance between the signals generated by the information encoder relative to the noise power.

On the other hand, the energy used per information bit is proportional to the average of the sum of squares of the signals generated by the information encoder. In the case of differential signaling, the information encoder generates signals 1 and −1, which implies that energy unit 1 is used per information bit while the distance between the two signals is 2 distance units. Where the tetrahedron map is used, 3/2 units of energy are used per information bit while the distance between two signals is √8, which is a factor of √2 larger than in differential signaling. By scaling the tetrahedron map by this factor to obtain the same distance between points as in differential signaling, the energy used per information bit is lowered. This implies that for an energy of 0.75 energy units per information bit, the error performance is similar to that of differential signaling. This corresponds to a 25% savings in power.

Figure 10:
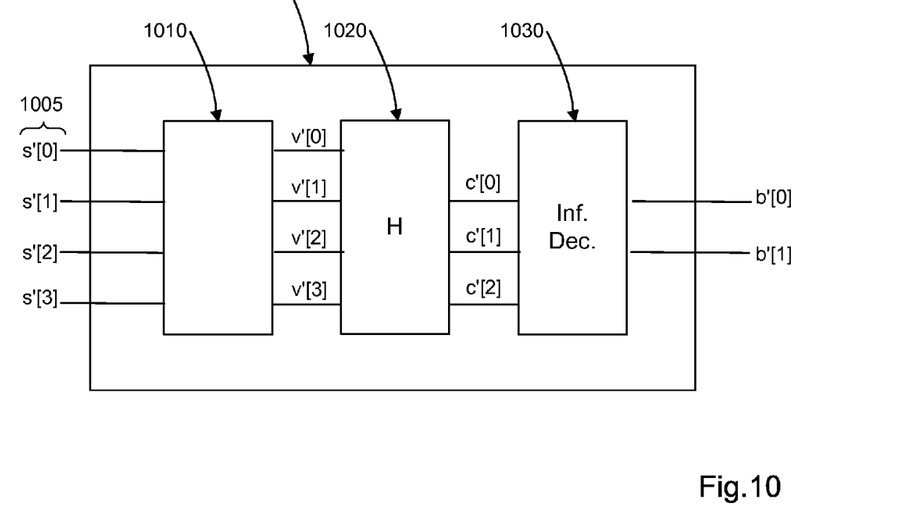
FIG. 10 is a schematic diagram depicting aspects of an example detransformer for coded orthogonal differential vector signaling corresponding to a transformer implementing a tetrahedron map in accordance with at least one embodiment of the invention.

A detransformer corresponding to the transformer depicted in FIG. 9 is shown in FIG. 10. The signals received from a bus 1005 are given by s'[0], . . . , s'[3]. These may be different from the signals s[0], . . . , s[3] that are transmitted on the bus due to noise, interference and/or attenuation. A bus receiver 1010 processes s'[0], . . . , s'[3] and creates a set of signals v'[0], . . . , v'[3]. In the embodiment shown in FIG. 10, the signals v'[0], . . . , v'[3] may be real numbers, which corresponds to the fact that a bus receiver 1010 has performed a sampling operation of the incoming signals. However, this sampling can also be performed after the vector signal decoding or the information decoding. Bus receiver 1010 sends signals v'[0], . . . , v'[3] to a vector signal decoder 1020. One task of vector signal decoder 1020 is to apply the inverse operation of a vector signal encoder. For this purpose, v'[0], . . . , v'[3] are multiplied by the inverse of the non-simple orthogonal matrix that is used in the corresponding vector signal encoder. A set of real numbers c'[0], . . . , c'[2] is generated as shown by Equation 5, and c'[0], . . . , c'[2] are fed to an information decoder 1030.

$$\begin{bmatrix} * \\ c'[0] \\ c'[1] \\ c'[2] \end{bmatrix} = \frac{1}{2}\begin{bmatrix} 1 & 1 & 1 & 1 \\ 1 & -1 & 1 & -1 \\ 1 & 1 & -1 & -1 \\ 1 & -1 & -1 & 1 \end{bmatrix}\begin{bmatrix} v'[0] \\ v'[1] \\ v'[2] \\ v'[3] \end{bmatrix} \quad \text{(Eqn. 5)}$$

The task of information decoder 1030 is to reconstruct the original bits b[0] and b[1] and, for this, information decoder 1030 may implement an optimal detector, wherein the detector finds the vector in the set {(−1,−1,−1),(−1,1,1),(1, 1,−1),(1,−1,1)} that has the smallest Euclidean distance to the vector c'=(c'[0], c'[1], c'[2]). This can be done in a variety of ways, as is well-known to those of skill in the art. For example, information decoder 1030 can calculate the Euclidean distance of the vector c' to all the vectors in the above set and then determine which one has the smallest distance.

Figure 11:
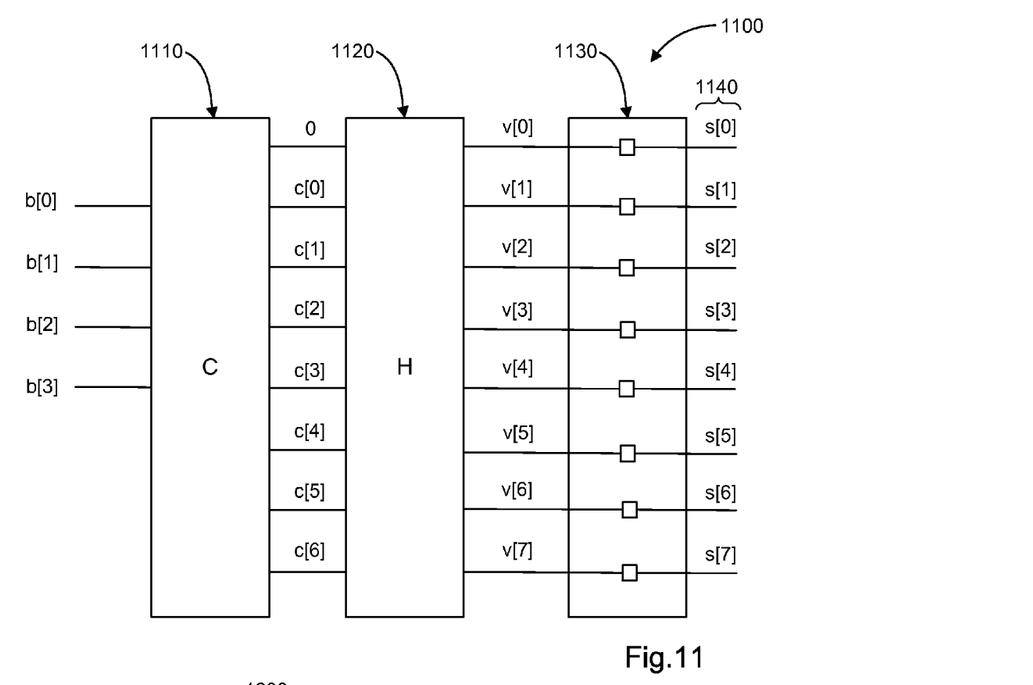
FIG. 11 is a schematic diagram depicting aspects of an example transformer for coded orthogonal differential vector signaling implementing, among other things, a Hamming code in accordance with at least one embodiment of the invention.

Another preferred embodiment of COVECS is illustrated in FIG. 11. In this figure, elements of a transformer 1100 are shown for a bus 1140 comprising eight wires. Four information bits b[0], . . . , b[3] are input to an information encoder 1110. Information encoder 1110 applies a binary matrix G to obtain x=x[0], . . . , x[6] as in Equation 6.

$$x = \begin{bmatrix} x[0] \\ \vdots \\ x[6] \end{bmatrix} = \begin{bmatrix} 1 & 0 & 0 & 0 \\ 0 & 1 & 0 & 0 \\ 0 & 0 & 1 & 0 \\ 0 & 0 & 0 & 1 \\ 1 & 1 & 1 & 0 \\ 1 & 1 & 0 & 1 \\ 1 & 0 & 1 & 1 \end{bmatrix}\begin{bmatrix} b[0] \\ b[1] \\ b[2] \\ b[3] \end{bmatrix} \quad \text{(Eqn. 6)}$$

One of ordinary skill in the art will recognize, after reading this disclosure, that the binary matrix G is a generator matrix of the Hamming code of length 7 and dimension 4. This code has a minimum distance d=3. Next, information encoder 1110 uses x to create a vector with real elements by interpreting the elements of x as real numbers and computing c−2·x−1. Information encoder 1110 forwards the elements of the vector c, c[0], . . . , c[6], to a vector signal generator 1120, which generates v[0], . . . , v[7] by applying a Hadamard matrix of order 8 to a vector that has its first component set to 0 and the others to c[0], . . . , c[6], as in Equation 7.

$$\begin{bmatrix} v[0] \\ v[1] \\ v[2] \\ v[3] \\ v[4] \\ v[5] \\ v[6] \\ v[7] \end{bmatrix} = \frac{1}{\sqrt{8}}\begin{bmatrix} 1 & 1 & 1 & 1 & 1 & 1 & 1 & 1 \\ 1 & -1 & 1 & -1 & 1 & -1 & 1 & -1 \\ 1 & 1 & -1 & -1 & 1 & 1 & -1 & -1 \\ 1 & 1 & -1 & 1 & 1 & -1 & -1 & 1 \\ 1 & 1 & 1 & 1 & -1 & -1 & -1 & -1 \\ 1 & -1 & 1 & -1 & -1 & 1 & -1 & 1 \\ 1 & 1 & -1 & -1 & -1 & -1 & 1 & 1 \\ 1 & -1 & -1 & 1 & -1 & 1 & 1 & -1 \end{bmatrix}\begin{bmatrix} 0 \\ c[0] \\ c[1] \\ c[2] \\ c[3] \\ c[4] \\ c[5] \\ c[6] \end{bmatrix} \quad \text{(Eqn. 7)}$$

Under the assumption that the noise incurred is Gaussian, this scheme requires about 58% of the energy required by differential signaling to obtain the same error performance, using the signals output by a signal generator 1130.

Figure 12:
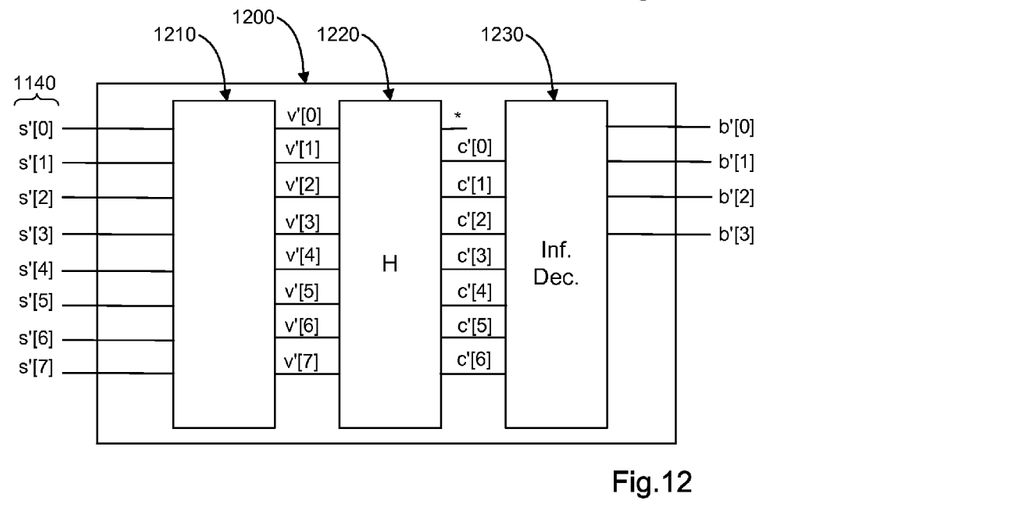
FIG. 12 is a schematic diagram depicting aspects of an example detransformer for coded orthogonal differential vector signaling corresponding to a transformer implementing a Hamming code in accordance with at least one embodiment of the invention.

An embodiment of a detransformer corresponding to the transformer of FIG. 11 is shown in FIG. 12. The signals received from bus 1140 are given by s'[0], . . . , s'[7] and these are possibly corrupted by noise and interference, which may make them different from the signals s[0], . . . , s[7] that are originally transmitted on the bus. A bus receiver 1210 processes s'[0], . . . , s'[7] and creates a set of signals v'[0], . . . , v'[7].

In the embodiment shown in FIG. 12, the signals v'[0], . . . , v'[7] may be real numbers, which means that bus receiver 1210 has performed a sampling operation of the incoming examples. However, as in the example with the tetrahedron map, this sampling can also be performed after vector signal decoding or information decoding bus receiver feeds the signals v'[0], . . . , v'[7] to a vector signal decoder 1220, which generates a set of real numbers c'[0], . . . , c'[7] as in Equation 8.

$$\begin{bmatrix} * \\ c'[0] \\ c'[1] \\ c'[2] \\ c'[3] \\ c'[4] \\ c'[5] \\ c'[6] \end{bmatrix} = \frac{1}{\sqrt{8}} \begin{bmatrix} 1 & 1 & 1 & 1 & 1 & 1 & 1 & 1 \\ 1 & -1 & 1 & -1 & 1 & -1 & 1 & -1 \\ 1 & 1 & -1 & -1 & 1 & 1 & -1 & -1 \\ 1 & 1 & -1 & 1 & 1 & -1 & -1 & 1 \\ 1 & 1 & 1 & 1 & -1 & -1 & -1 & -1 \\ 1 & -1 & 1 & -1 & -1 & 1 & -1 & 1 \\ 1 & 1 & -1 & -1 & -1 & -1 & 1 & 1 \\ 1 & -1 & -1 & 1 & -1 & 1 & 1 & -1 \end{bmatrix} \begin{bmatrix} v'[0] \\ v'[1] \\ v'[2] \\ v'[3] \\ v'[4] \\ v'[5] \\ v'[6] \\ v'[7] \end{bmatrix} \quad \text{(Eqn. 8)}$$

These are fed to an information decoder 1230. One task of the information decoder 1230 is to reconstruct the original bits b[0], . . . , b[3] if possible. For this, information decoder 1230 may implement an optimal decoder. Let C denote a set with the codewords of the Hamming code, as its elements where a zero bit is mapped to a 1 and a one bit is mapped to a −1. In several noise scenarios, the optimal decoder is the one that compares c'[0], . . . , c'[7] to the elements of C. Let c' be a vector having as its elements c'[0], c'[1], . . . , c'[7]. Information decoder 1230 estimates the transmitted codeword c as in Equation 9.

$$c = \underset{x \in C}{\operatorname{argmin}}(x - c')^2 \quad \text{(Eqn. 9)}$$

Since the map from b[0], . . . , b[3] to the codewords is injective, information decoder can generate b[0], . . . , b[3] from c. In one embodiment of the present invention, b[0], . . . , b[3] coincide with (c[0]−1, . . . , c[3]−1)/2. In another embodiment, information decoder 1230 first computes a quantity z[i] for i=0, . . . , 6 as in Equation 10.

$$Z[i] = \operatorname{sign}(c[i]) \quad \text{(Eqn. 10)}$$

Next, information decoder 1230 performs the multiplication shown in Equation 11, wherein the multiplication on the right is to be understood as multiplication over the finite field GF(2).

$$(d[0], d[1], d[2]) = \frac{1}{2}(z[0] - 1, \ldots, z[6] - 1) \begin{bmatrix} 1 & 1 & 1 \\ 1 & 1 & 0 \\ 1 & 0 & 1 \\ 0 & 1 & 1 \\ 1 & 0 & 0 \\ 0 & 1 & 0 \\ 0 & 0 & 1 \end{bmatrix} \quad \text{(Eqn. 11)}$$

Next, information decoder 1230 compares the vector (d[0], d[1], d[2]) to the rows of the matrix on the right; if it is zero, then information decoder 1230 deduces that no error has occurred. If not, then the vector is equal to one of the rows of the matrix on the right. If it is the row with index j, then the value of z[j] is multiplied by −1. The elements b[0], . . . , b[3] are then set as in Equation 12.

$$b[0], \ldots, b[3] = \frac{1}{2}(z[0] - 1, \ldots, z[3] - 1) \quad \text{(Eqn. 12)}$$

One of ordinary skill in the art will recognize after reading this disclosure that this procedure performs a hard decision decoding of the [7,4,3] Hamming code.

General Operation of COVECS

Figure 13:
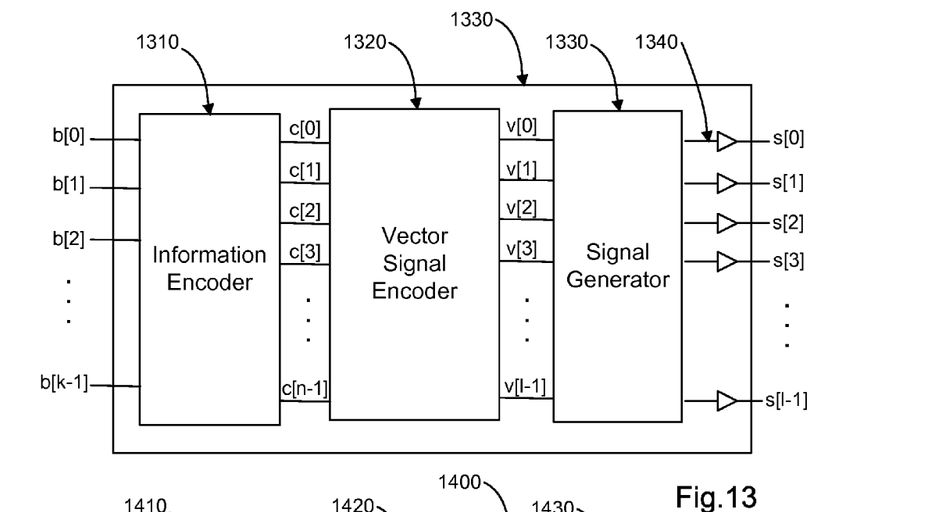
FIG. 13 is a schematic diagram depicting aspects of a transformer for general coded orthogonal differential vector signaling in accordance with at least one embodiment of the invention.

The general operation of a transformer 1300 using COVECS is illustrated in FIG. 13. An input to the information encoder 1310 comprises a sequence of symbols b[0], . . . , b[k−1]. Each of the b[i] take a value in an alphabet S with a finite number of elements. Information encoder 1310 generates a sequence of symbols c[0], . . . , c[n−1] by applying a map $C: S^k \to F^n$ where F denotes the set of real or complex numbers. The map C will be injective.

In a preferred embodiment, S and F are equal to GF(2) and the operation of C can be described by a composition of two maps. The function g maps the input bits b[0], . . . , b[k−1] to a sequence of bits x[0], . . . , x[n−1] and the map f maps this latter sequence to n real or complex numbers c[0], . . . , c[n−1]. In yet another preferred embodiment, the map g is linear and defines a binary error-correcting code of minimum distance d. The choice of the code determines the eventual power consumption required to meet a particular performance criterion. In general, k and n will be of moderate size and suitable choices for codes may be for example, Hamming codes, Hadamard codes, Reed-Muller codes, Golay codes, and/or low-density parity-check ("LDPC") codes. Other choices are also possible, as is known to those of ordinary skill in the art. Where a binary error-correcting code is used, f may take the form whenever each "0" bit of a codeword is replaced by a real value of 1 and each "1" bit of a codeword is replaced by a real value of −1. Information encoder 1310 forwards the resulting vector of n numbers to a vector signal encoder 1320.

Vector signal encoder 1320 creates a sequence of l numbers v[0], . . . , v[l−1] based on the incoming c[0], . . . , c[n−1]. If v denotes a vector comprising v[0], . . . , v[l−1] and c denotes a vector comprising c[0], . . . , c[n−1], then vector signal encoder 1320 generating the vector v as in Equation 13, wherein P is a l×n matrix with the property that each row of P either consists of all zeroes or contains a single 1. The matrix H is a non-simple orthogonal matrix of size n, i.e., n>2.

$$V = HPc \quad \text{(Eqn. 13)}$$

Figure 14:
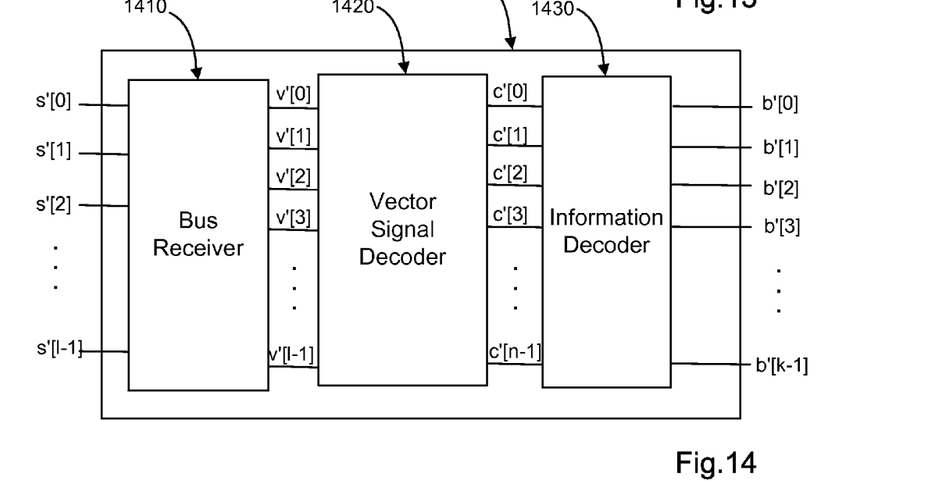
FIG. 14 is a schematic diagram depicting aspects of a detransformer for general coded orthogonal differential vector signaling in accordance with at least one embodiment of the invention.

The general operation of a detransformer 1430 is depicted in FIG. 14. The signals received from a bus are given by s'[0], . . . , s'[l−1] and these are possibly corrupted by noise and interference that may make them different than the signals s[0], . . . , s[l−1] that are transmitted on the bus. A bus receiver 1410 may perform amplification, filtering or equalization of these signals before they are passed to a vector signal decoder 1420. Vector signal decoder 1420 applies the inverse operation of a vector signal encoder 1420. Denoting the output of the vector signal decoder 1420 as c'[0], . . . , c'[n−1], by c', the vector signal decoder 1420 generates c' as in Equation 14, wherein v' denotes the vector containing v'[0], . . . , v'[l−1], $H^{-1}$ denotes the inverse of the non-simple orthogonal matrix H, and $P^T$ denotes the transpose of the matrix P used in a vector signal encoder 1420.

$$c' = P^T H^{-1} v' \quad \text{(Eqn. 14)}$$

The resulting vector c' is forwarded by vector signal decoder 1420 to an information decoder 1430. Information decoder 1430 then can use methods well-known to those of ordinary skill in the art to generate an estimate of the initial symbols b[0], . . . , b[k−1]. In an embodiment, the operation of vector signal decoder 1420 and information decoder 1430 can be combined into a single entity or operation.

As the various figures illustrate, quite complex operations can be handled by simple circuits, such as obtaining a number of input bits, encoding them, performing vector signal encoding using a non-simple orthogonal matrix, and generating corresponding signals in a manner to increase pin-efficiency over differential signaling, reduce power usage and SSO noise, etc. to facilitate chip-to-chip communications.

Further embodiments can be envisioned to one of ordinary skill in the art after reading this disclosure. In other embodiments, combinations or sub-combinations of the above disclosed invention can be advantageously made. The example arrangements of components are shown for purposes of illustration and it should be understood that combinations, additions, re-arrangements, and the like are contemplated in alternative embodiments of the present invention. Thus, while the invention has been described with respect to exemplary embodiments, one skilled in the art will recognize that numerous modifications are possible.

For example, the processes described herein may be implemented using hardware components, software components, and/or any combination thereof. This should be apparent even as to the figures and explanations expressed in mathematical terms or as numerical operations. For example, manipulating a complex number might comprise having computer instructions to read two numbers from electronic storage and treat one as the real component and the other as the imaginary component. The specification and drawings are, accordingly, to be regarded in an illustrative rather than a restrictive sense. It will, however, be evident that various modifications and changes may be made thereunto without departing from the broader spirit and scope of the invention as set forth in the claims and that the invention is intended to cover all modifications and equivalents within the scope of the following claims.

What is claimed is:

1. A method of transmitting information over a multi-wire data bus, the information being transmitted as a series of vector codewords of a vector signaling code, each vector codeword encoded by a non-simple orthogonal or unitary matrix, the method comprising, for each vector codeword:
   receiving a first set of physical signals representing the information;
   forming a second set of physical signals based, at least in part, on the first set of physical signals wherein the second set of physical signals represents an enlarged minimum Hamming or Euclidean distance encoding of the first set of physical signals, the enlarged minimum Hamming or Euclidean distance encoding providing an error-performance level coding gain, and the second set of physical signals comprises at least one more signal than the first set of physical signals;
   forming a third set of physical signals based, at least in part, on the second set of physical signals and a set of columns of the non-simple orthogonal or unitary matrix, wherein the third set of physical signals represent a weighted sum of the set of columns, each column corresponding to a respective signal of the second set of signals, wherein each column of the set of columns (i) has elements that sum to zero, (ii) is mutually orthogonal and (iii) is orthogonal to a common-mode all one column, the set of columns and the common-mode all one column collectively forming the non-simple orthogonal or unitary matrix; and
   providing the third set of physical signals for transmission over the multi-wire data bus at a transmission power level having an energy per information bit that provides an error performance level that is greater than an error performance level of a differential signal having an equal amount of energy per information bit.

2. The method of claim 1, further comprising:
   receiving a fourth set of physical signals;
   forming the second set of physical signals based, at least in part, on the fourth set of physical signals and a balancing transformation that at least ensures that the second set of physical signals has a size matching a size of the non-simple orthogonal or unitary matrix; and
   forming the first set of physical signals based at least in part on the second set of physical signals.

3. The method of claim 2, wherein the size of the third set of physical signals is larger than a size of the second set of physical signals.

4. The method of claim 1, wherein at least one of the third set of physical signals has a signal value corresponding to a matrix multiplication of the non-simple orthogonal or unitary matrix with a vector having entries corresponding to signal values of the second set of physical signals.

5. The method of claim 4, wherein the entries of the vector correspond to real numbers and/or complex numbers.

6. A method of transmitting information according to claim 1, wherein at least one of the second set of physical signals has values in the set of real numbers, and the different second set of signals have a substantially large Euclidean distance.

7. The method of transmitting information according to claim 1, wherein at least one of the second set of physical signals has values in the set of complex numbers.

8. The method of claim 1, wherein the number of signals in the first set is two and the number of signals in the second set is three and wherein the set of possible triple of signals in the second set form the corners of a regular tetrahedron in three dimensional real space.

9. The method of claim 1, wherein the set of possible signals in the second set form a regular simplex.

10. The method of claim 1, wherein the set of possible signals in the second set form a binary code wherein every 0 is replaced by a real number a and every 1 is replaced by a real number b.

11. The method of claim 10, wherein a is 1 and b is −1, or vice versa.

12. The method of claim 10, wherein the binary code is one of a Hamming code, a Reed-Muller code, a Golay code, or a low-density parity-check code.

13. The method of claim 1, wherein the non-simple orthogonal or unitary matrix is a Hadamard matrix.

14. The method of claim 13, wherein the Hadamard matrix has a size of at least 3, and the Hadamard matrix is of Sylvester type.

15. The method of claim 14, wherein forming the third set of physical signals comprises applying a Fast Hadamard-Walsh Transform configured with a Hadamard matrix of Sylvester type to the second set of physical signals.

16. The method of claim 1, further comprising:
   receiving a fourth set of physical signals corresponding to the third set of physical signals;
   forming a fifth set of physical signals based at least in part on the fourth set of physical signals and the non-simple orthogonal or unitary matrix, the fifth set of physical signals corresponding to the second set of physical signals; and,
   forming a sixth set of physical signals based at least in part on the fifth set of physical signals, the sixth set of physical signals corresponding to the first set of physical signals.

17. The method of claim 16, wherein a pin-efficiency is greater than 66% and less than 100%.

18. The method of claim 1, wherein a pin-efficiency is greater than 50%.

19. The method of claim 1, wherein noise resistance is greater than noise resistance of single-ended signaling and greater than noise resistance of differential signaling.

20. A method of transmitting information over a multi-wire data t incorporating multiple signal paths, the information being transmitted as a series of vector codewords, each vector codeword encoded by a non-simple orthogonal or unitary matrix, the method comprising:
receiving input signals representing the information;
allocating the input signals to a plurality of input signal subsets;
forming a plurality of a second set of signals corresponding to the plurality of input signal sets wherein the second set of physical signals represents an enlarged minimum Hamming or Euclidean distance encoding of the first set of physical signals, the enlarged minimum Hamming or Euclidean distance encoding providing an error-performance level coding gain, each of the plurality of the second set of signals based at least in part on a corresponding one of the plurality of input signal subsets, at least one of the plurality of second signal sets being a function of at least one of the corresponding input signal subsets, wherein at least one of the second sets of signals has at least one more signal than the corresponding input signal subset;
forming a plurality of transmission sets of signals corresponding to the plurality of second signal sets, each of the plurality of the transmission sets of signals based at least in part on a corresponding one of the plurality of second signal subsets, at least one of the plurality of transmission sets of signals being transformed from at least one corresponding second signal subset in accordance with a set of columns of the non-simple orthogonal or unitary matrix, the at least one transmission set of signals representing a weighted sum of the set of columns, wherein each column is weighted with a corresponding signal of the corresponding second signal subset, and wherein each column (i) has elements that sum to zero, (ii) is mutually orthogonal and (iii) is orthogonal to a common-mode all one column; and
providing the plurality of transmission sets of signals for transmission over the multi-wire data bus at a transmission power level having an energy per information bit that provides an error performance level that is greater than an error performance level of a differential signal having an equal amount of energy per information bit.

21. The method of claim 20, further comprising:
receiving a plurality of transmitted sets of signals corresponding to the plurality of transmission sets of signals; and
forming an output set of signals based at least in part on the plurality of transmitted sets of signals, at least some of the output set of signals being transformed from at least one of the plurality of transmitted sets of signals corresponding to said at least one of the plurality of transmission sets of signals in accordance with said non-simple orthogonal or unitary matrix.

22. The method of claim 20, wherein the multi-wire data bus includes at least two optical fibers.

23. A method, using a non-simple orthogonal or unitary matrix, of processing a series of received signals received from a multi-wire data bus as a series of vector codewords, comprising, for each signal:
receiving a first set of physical encoded signals on the multi-wire data bus;
forming a second set of physical signals based, at least in part, on the first set of physical encoded signals and a set of columns of the non-simple orthogonal or unitary matrix using a circuit that represents the non-simple orthogonal or unitary matrix wherein the second set of physical signals represents an enlarged minimum Hamming or Euclidean distance encoding of the first set of physical signals, the enlarged minimum Hamming or Euclidean distance encoding providing an error-performance level coding gain, wherein the second set of physical signal comprises at least one fewer signal than the first set of physical signals, wherein each column of the set of columns (i) has elements that sum to zero is mutually orthogonal and (iii) is orthogonal to a common-mode all one column, the of columns and the common-mode all one column collectively forming the non-simple orthogonal or unitary matrix; and,
providing the second set of physical signals as received information encoded into the physical encoded signals at a transmission power level having an energy per information bit that provides an error performance level that is greater than an error performance level of a differential signal having an equal amount of energy per information bit.

24. The method of claim 23, wherein at least one of the first set of physical signals has a signal value corresponding to a matrix multiplication of the non-simple orthogonal or unitary matrix with a vector having entries corresponding to signal values of values corresponding to the second set of physical signals.

25. The method of claim 24, wherein the entries of the vector correspond to real numbers and/or complex numbers.

26. The method of claim 23, wherein the number of signals in the first set is three and the number of signals in the second set is two and wherein the set of possible triple of signals in the first set form the corners of a regular tetrahedron in three dimensional real space.

27. The method of claim 23, wherein the set of possible signals in the first set form a regular simplex.

* * * * *